US008457244B2

(12) United States Patent
Johansson

(10) Patent No.: US 8,457,244 B2
(45) Date of Patent: Jun. 4, 2013

(54) ANTENNA AND RADIO ARRANGEMENT

(75) Inventor: Stefan Johansson, Romelanda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 271 days.

(21) Appl. No.: 12/808,458

(22) PCT Filed: Dec. 17, 2007

(86) PCT No.: PCT/SE2007/001120
§ 371 (c)(1),
(2), (4) Date: Jun. 16, 2010

(87) PCT Pub. No.: WO2009/078750
PCT Pub. Date: Jun. 25, 2009

(65) Prior Publication Data

US 2011/0110438 A1 May 12, 2011

(51) Int. Cl.
*H04L 27/00* (2006.01)

(52) U.S. Cl.
USPC ........... 375/295; 375/130; 375/146; 375/147; 375/219; 375/259; 375/267; 375/299; 375/316; 375/347; 370/272; 370/273; 370/276; 370/297; 370/320; 370/334; 370/335; 370/342; 370/441; 370/479; 455/73; 455/101; 455/132; 455/500; 455/562.1

(58) Field of Classification Search
USPC ................. 375/130, 146, 147, 219, 259, 267, 375/295, 299, 316, 347; 370/272, 273, 276, 370/297, 320, 334, 335, 342, 441, 479; 455/73, 455/101, 132, 500, 562.1
See application file for complete search history.

(56) References Cited

U.S. PATENT DOCUMENTS

| | | | | |
|---|---|---|---|---|
| 6,181,920 | B1 * | 1/2001 | Dent et al. | 455/101 |
| 2002/0106034 | A1 | 8/2002 | Cooper | |
| 2002/0132600 | A1 * | 9/2002 | Rudrapatna | 455/277.1 |
| 2003/0123877 | A1 * | 7/2003 | Lo | 398/34 |
| 2004/0192233 | A1 * | 9/2004 | Mitzlaff | 455/127.1 |
| 2007/0191064 | A1 | 8/2007 | Skarby et al. | |

FOREIGN PATENT DOCUMENTS

WO WO 03/088511 A1 10/2003

* cited by examiner

*Primary Examiner* — Leon Flores

(57) ABSTRACT

The present invention relates to an antenna and radio arrangement comprising at least a first antenna and a second antenna, each having a first antenna port and a second antenna port, the arrangement further comprising at least four first transmitting means, where the first antenna's first antenna port is connected to a first transmitting means, the first antenna's second antenna port is connected to a second transmitting means, the second antenna's first antenna port is connected to a third transmitting means, and the second antenna's second antenna port is connected to a fourth transmitting means. At least two transmitting means transmit signals to the corresponding antenna ports, said signals being modulated by the same stream of digital signals and having the same radio carrier frequency, thus accomplishing a spatial combining of the output signals. The present invention also relates to a corresponding method.

13 Claims, 7 Drawing Sheets

ANTENNA AND RADIO ARRANGEMENT

TECHNICAL FIELD

The present invention relates to an antenna and radio arrangement comprising at least a first antenna, having a first antenna port and a second antenna port, and a second antenna, having a first antenna port and a second antenna port, the arrangement further comprising at least a first transmitting means, a second transmitting means, a third transmitting means and a fourth transmitting means, where the first antenna's first antenna port is connected to the first transmitting means, the first antenna's second antenna port is connected to the second transmitting means, the second antenna's first antenna port is connected to the third transmitting means, and the second antenna's second antenna port is connected to the fourth transmitting means.

The present invention also relates to a method for handling an antenna and radio arrangement comprising at least a first antenna, having a first antenna port and a second antenna port, and a second antenna, having a first antenna port and a second antenna port, where the method comprises the following steps: connecting the first antenna's first antenna port to a first transmitting means; connecting the first antenna's second antenna port to a second transmitting means; connecting the second antenna's first antenna port to a third transmitting means; and connecting the second antenna's second antenna port to a fourth transmitting means.

BACKGROUND

Today, base stations are used for communicating with different kinds of user equipment, for example cell phones and laptops. A base station normally comprises a number of sector antennas, where each sector antenna is constituted by a vertically arranged column of radiating antenna, elements. Often, each antenna element is dual polarized, the two polarizations being mutually orthogonal.

A dual polarized sector antenna according to the above thus has two antenna ports, one for each polarization. The ports are coupled to at least one transmitter receiver unit, TRU, also called transceiver unit. A TRU commonly comprises one transmitter sub-unit, TX, and two receiver sub-units, RXA, RXB. The two receiver sub-units are normally used for two-way receiver diversity, i.e. each receiver sub-unit receives signals from one of two antenna ports, respectively, and the signals from each receiver sub-unit are then combined to get a maximized quality of the received signal.

If the receiver sub-units are connected to the two ports of a dual polarized antenna, one commonly refers to this as polarization diversity, and if the receiver sub-units are connected to two antennas that are separated by some distance, one refers to this as space diversity.

Preferably, it is desirable to have more than one transceiver per sector (or cell) in order to increase the capacity in the sector. FIG. 1*a* shows an example where two TRU's P1, P2 are connected to one sector antenna P3. In this case, a transmitter sub-unit P4 of the first TRU P1 is connected to a first antenna port P5 via a first duplex filter DPX1, while a transmitter sub-unit P6 of the second TRU P2 is connected to a second antenna port P7 via a second duplex filter DPX2. A respective first receiver sub-unit P8, P9 of the TRU's is connected to the first antenna port P5 via the first duplex filter DPX1. A respective second receiver sub-unit P10, P11 of the TRU's is connected to the second antenna port P7 via the second duplex filter DPX2.

If more than two TRU's are desired in one sector, while only having two antenna ports, it is necessary to combine the transmitters of the TRU's using for instance a hybrid combiner.

FIG. 1*b* illustrates an example where four TRU's P12, P13, P14, P15 are connected to one sector antenna P3 having two antenna ports P5, P7 as in the first case. In this case, the transmitter P16 of the first TRU P12 and the transmitter P17 of the second TRU P13 are combined in a first hybrid combiner P18A and then connected to the first antenna port P5 via a first duplex filter DPX1, while the transmitter P19 of the third TRU P14 and the transmitter P20 of the fourth TRU P15 are combined in a second hybrid combiner P18B and then connected to the second antenna port P7 via a second duplex filter DPX2. In a similar way as for the arrangement according to FIG. 1*a*, the respective first receiver sub-units P21, P22, P23, P24 of all TRU's are connected to the first antenna port P5 via the first duplex filter DPX1, and the respective second receiver sub-units P25, P26, P27, P28 of all TRU's are connected to the second antenna port P7 via the second duplex filter DPX2.

The drawback of using the hybrid combiners P18A, P18B is that half the output power is lost in each combiner.

Another possibility to accomplish four TRU's per sector is to have an additional dual polarized sector antenna, as shown in prior art FIG. 1*c*. Here, a first dual polarized sector antenna P29 and a second dual polarized sector antenna P30 having first antenna ports P31, P33 and second antenna ports P32, P34, respectively, are placed beside each other with a certain distance between the antennas P29, P30. The antenna and radio arrangement comprises four TRU's P35, P36, P37, P38. The first antenna's second antenna port P32 and the second antenna's first antenna port P33 are each connected to four receiver sub-units P39, P40, P41, P42; P43, P44, P45, P46 and one transmitter sub-unit P47, P48, via a respective duplex filter, DPX1, DPX2, while the first antenna's first antenna port P31 and the second antenna's second antenna port P34 only are connected to a respective transmitter sub-unit P49, P50 via a respective band pass filter, TXBP1, TXBP2. Obviously there are other ways to connect the TRU's to the antennas giving the same functionality.

This antenna and radio arrangement has a certain coverage which in many cases preferably is increased by improving the link budget in downlink as well as uplink.

The downlink budget can be improved by having transmitters with higher output power. One way to increase the output power is to let the transmitters of two TRU's operate according to TCC (Transmitter Coherent Combining), as described for example in WO 03/088511, where both the transmitters are provided with the same stream of modulating digital signals and operate at the same radio carrier frequency and the two amplified output signals are combined into one by means of a proper phase compensation in order to have the signals adding in phase. By means of this arrangement the output power is approximately doubled, and thereby the downlink is improved by 3 dB, but the downlink signal capacity is reduced to half since the two transmitters act as one. An improvement of 3 dB or more in uplink budget can be obtained by making use of the two pairs of receiver in the two TRU's to operate as a 4WRD (4-Way Receiver Diversity) receiver instead of two separate receivers with 2WRD (2-way Receiver Diversity), i.e. each of the four receivers receives signal from one unique antenna port and the signals from each receiver are combined to get a maximized quality of the received signal. The uplink signal capacity is then reduced to half since the two pairs of receivers in each TRU act as one 4WRD receiver.

An example of a TCC and 4WRD arrangement is shown in prior art FIG. 2, where a first dual polarized sector antenna P29 and a second dual polarized sector antenna P30 having a first antenna port P31, P33 and a second antenna port P32, P34, respectively, are placed beside each other with a certain distance between the antennas P29, P30 in the same way as described for FIG. 1*c*.

The antenna and radio arrangement comprises four TRU's P51, P52, P53, P54. The first antenna's second antenna port P32 is connected to a first duplex filter DPX1, from which the antenna port P32 is connected to a respective second RX sub-unit P55, P56 in the first TRU P51 and the third TRU P53, and to a first combiner/hybrid P57. The first combiner P57 is connected to a respective TX sub-unit P58, P59 in the first TRU P51 and the second TRU P52, thus combining said TX sub-units P58, P59 to the first antenna's second antenna port P32. This pair of TX sub-units P58, P59 operates as one transmitter unit according to TCC.

In a similar way, the second antenna's first antenna port P33 is connected to a second duplex filter DPX2, from which the antenna port P33 is connected to a respective first RX sub-unit P60, P61 in the second TRU P52 and the fourth TRU P54, and to a second combiner/hybrid P62. The second power combiner/hybrid P62 is connected to a respective TX sub-unit P63, P64 in the third TRU P53 and the fourth TRU P54, thus combining said TX sub-units P63, P64 to the second antenna's first antenna port P33. These two TX sub-units P63, P64 operate as one transmitter unit according to TCC.

The remaining antenna ports P31, P34 are connected to two RX sub-units P65, P66; P67, P68 each, the first RX sub-units P65, P66 in the first TRU P51 and the third TRU P53, and the second RX sub-units P67, P68 in the second TRU P52 and the fourth TRU P54, via a respective band pass filter RXBP1, RXBP2.

The RX sub-units P65, P55, P61, P67 of the first TRU P51 and the second TRU P52 each receive signals from the four antenna ports P31, P32, P33, P34, respectively. This first set of four RX sub-units P65, P55, P61, P67 forms a first 4WRD receiver. Furthermore, the RX sub-units P66, P56, P60, P68 of the third TRU P53 and the fourth TRU P54 each receive signals from the four antenna ports P31, P32, P33, P34, respectively. This second set of four RX sub-units forms a second 4WRD receiver.

The arrangement according to FIG. 2 improves the downlink and the uplink budgets by approximately 3 dB. However, the signal capacity in both down- and uplink is reduced with a factor two, since the four TRU's P51, P52, P53, P54 operate in two pairs, where each pair transmits and receives the same digital signals.

There evidently exists a need for an enhanced antenna and radio arrangement where the down- and uplink budgets are improved and thereby coverage is increased at a lower cost, an extended coverage is achieved at the same cost, or a possibility to achieve an adaptive coverage using existent equipment. The object of the present invention is thus to provide such an enhanced antenna arrangement.

SUMMARY

The object stated above is solved by means of an antenna arrangement as mentioned initially, where furthermore at least two transmitting means transmit signals to the corresponding antenna ports, said signals being modulated by the same stream of digital signals and having the same radio carrier frequency, thus accomplishing a spatial combining of the output signals.

The object stated above is also solved by means of a method as mentioned initially, where furthermore the method comprises the following step: using at least two transmitting means for transmitting signals to the corresponding antenna ports, said signals being modulated by the same stream of digital signals and having the same radio carrier frequency, thus accomplishing a spatial combining of the output signals.

According to a preferred embodiment, the transmitted signals being modulated by the streams of digital signals are transmitted via pairs of antenna ports having essentially the same polarizations.

According to another preferred embodiment, the arrangement further comprises a number of receiving means, such that each group of one transmitting means and two receiving means forms one transmitting and receiving unit, where the four receiving means of two transceiver units are connected to the first antenna's first antenna port, the first antenna's second antenna port, the second antenna's first antenna port and the second antenna's second antenna port such that a 4-Way Receiver Diversity, 4WRD, receiver functionality is obtained.

According to another preferred embodiment, the connection arrangement above is repeated for every two transceiver units in the antenna and radio arrangement, each such pair of transceiver units forming a 4WRD receiver.

According to another preferred embodiment, the antennas are mounted on top of each other.

According to another preferred embodiment, a controlling means is arranged to control to which transmitting means that each stream of digital signals to modulate the transmitters is connected, and to control to which receiving means that each received stream of digital signals is connected, the controlling means using suitable software.

Other preferred embodiments are evident from the dependent claims.

A number of advantages are obtained by means of the present invention. For example:

- an enhanced antenna and radio arrangement where the downlink budgets are improved is provided;
- coverage is increased at a lower cost than provided by previously known arrangements; and
- a possibility to achieve an adaptive coverage using existent equipment is provided.

BRIEF DESCRIPTION OF THE DRAWINGS

The present invention will now be described more in detail with reference to the appended drawings, where.

DETAILED DESCRIPTION

Figure 3:
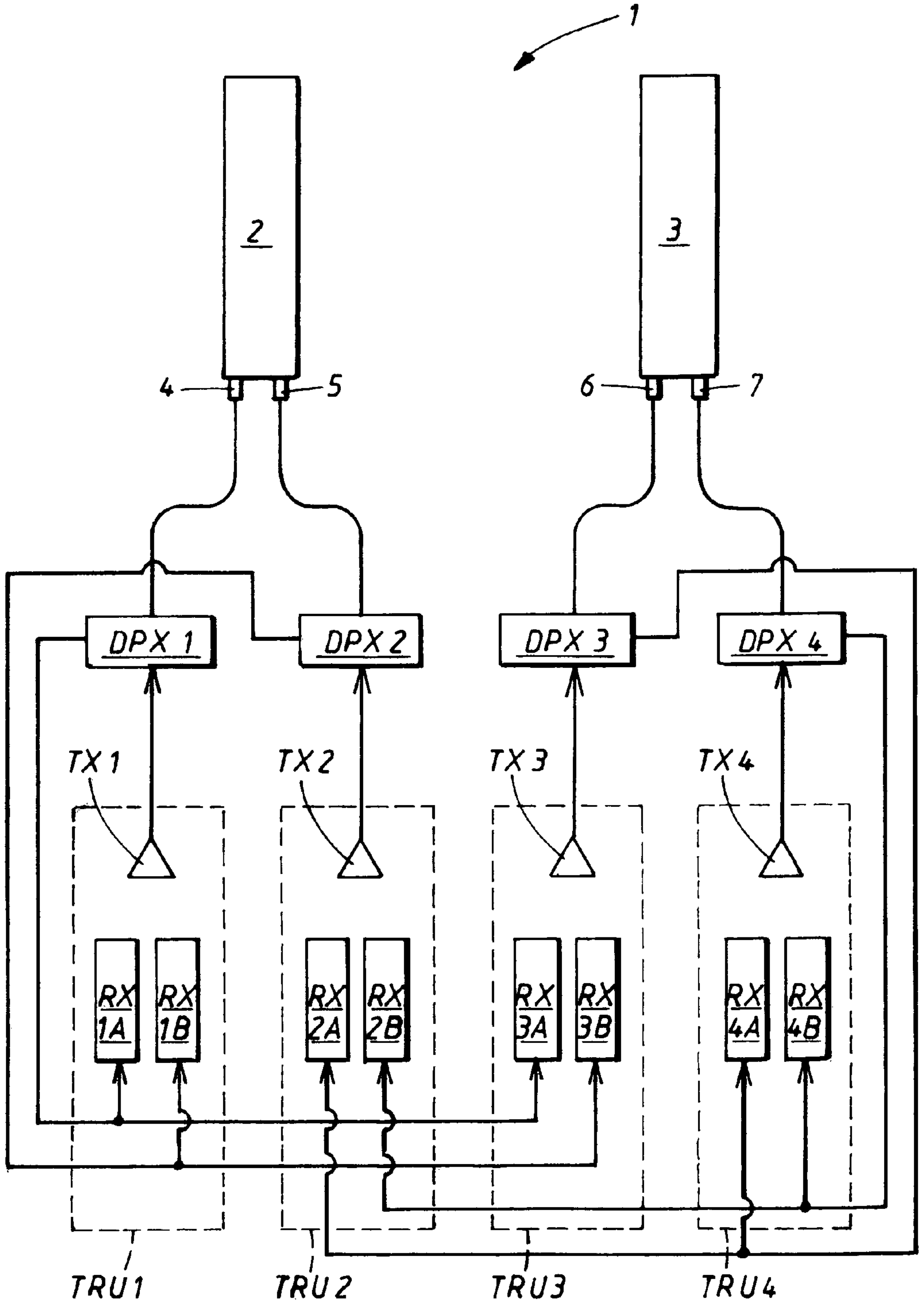
FIG. 3 schematically shows an antenna arrangement according to a first embodiment of the present invention.

With reference to FIG. 3, showing a first embodiment of the present invention, an antenna and radio arrangement 1 comprises a first dual polarized sector antenna 2 and a second dual polarized sector antenna 3 having a first antenna port 4, 6 and a second antenna port 5, 7, respectively, which antennas 2, 3 are placed with a certain distance between them. Each sector antenna 2, 3 is constituted by a vertically arranged column of radiating antenna elements, each antenna element being dual polarized, where the two polarizations are mutually mainly orthogonal.

In the embodiment example, each first antenna port 4, 6 is associated with an antenna polarization that has a +45° orientation relative to each sector antenna's longitudinal and vertical extension, and each second antenna port 5, 7 is associated with an antenna polarization that has a −45° orientation relative each sector antenna's longitudinal and vertical extension.

The antenna and radio arrangement 1 further comprises a first transceiver unit TRU1, a second transceiver unit TRU2, a third transceiver unit TRU3, and a fourth transceiver unit TRU4.

The first transceiver unit TRU1 comprises one transmitter sub-unit TX1, a first receiver sub-unit RX1A and a second receiver sub-unit RX1B. The other transceiver units TRU2, TRU3, TRU4, comprise corresponding transmitter sub-units TX2, TX3, TX4 and receiver sub-units RX2A, RX2B; RX3A, RX3B; RX4A, RX4B.

The first antenna's first antenna port 4 is connected to a first duplex filter DPX1, from which said antenna port is connected to the first receiver sub-units RX1A, RX3A of the first and third transceiver units TRU1, TRU3, and to the transmitter sub-unit TX1 of the first transceiver unit TRU1.

The first antenna's second antenna port 5 is connected to a second duplex filter DPX2, from which said antenna port is connected to the second receiver sub-units RX1B, RX3B of the first and third transceiver units TRU1, TRU3, and to the transmitter sub-unit TX2 of the second transceiver unit TRU2.

The second antenna's first antenna port 6 is connected to a third duplex filter DPX3, from which said antenna port is connected to the first receiver sub-units RX2A, RX4A of the second and fourth transceiver units TRU2, TRU4, and to the transmitter sub-unit TX3 of the third transceiver unit TRU3.

Finally, the second antenna's second antenna port 7 is connected to a fourth duplex filter DPX4, from which said antenna port is connected to the second receiver sub-units RX2B, RX4B of the second and fourth transceiver units TRU2, TRU4, and to the transmitter sub-unit TX4 of the fourth transceiver unit TRU4.

According to the present invention, it is possible to provide the transmitter sub-unit TX1 of the first transceiver unit TRU1 and the transmitter sub-unit TX2 of the second transceiver unit TRU2 with the same modulating digital signal, and let the two transmitter sub-units TX1, TX2 operate at the same radio carrier frequency, thus accomplishing a so-called spatial combining of the output signals. Thereby, the two output signals carrying the same modulating stream of digital signals are combined in space, when they have left the antenna's radiating elements, and not before, and hence the term Transmitter Spatial Combining (TSC). In this way, an output signal with 3 dB higher output power is obtained compared with the configuration according to FIG. 1*c*, for the first antenna. However, the downlink signal capacity is reduced to half for the first antenna 2, since it only transmits one stream of digital signals instead of two, compared to the configuration in FIG. 1*c*.

If the two output signals are combined in phase after the first antenna 2, having the respective polarizations+45° and −45° relative to the vertical, the transmitted wave will have a vertical polarization.

In the present invention it is also possible to let the four receiver sub-units RX1A, RX1B, RX2A, RX2B of the first transceiver unit TRU1 and the second transceiver unit TRU2 form one receiver with 4WRD, since each of them are connected to one unique antenna port. Thus at least a 3 dB improvement in the uplink is obtained. The uplink signal capacity of the first transceiver unit TRU1 and the second transceiver unit TRU2 is then reduced to half, since the two pairs of receiver sub-units RX1A, RX1B; RX2A, RX2B in each transceiver unit TRU1, TRU2 act as one 4WRD receiver. Thus the balance in up- and downlink will remain unaltered, since TSC improves the downlink by approximately 3 dB and 4WRD improves the uplink by approximately 3 dB.

In a similar manner, the transmitter sub-unit TX3 of the third transceiver unit TRU3 and the transmitter sub-unit TX4 of the fourth transceiver unit TRU4 can be provided with the same digital signal and operate at the same radio frequency, thus accomplishing a 3 dB higher output power by adopting transmitter spatial combining (TSC) in the second antenna. Similar, also the four receiver sub-units RX3A, RX3B, RX4A, RX4B of the third transceiver unit TRU3 and the fourth transceiver unit TRU4 can form one receiver with 4WRD, since each of them is connected to one unique antenna port An advantage of the configuration of the present invention as described in FIG. 3 is that the antenna and radio arrangement 1 can be the same independently of if TSC and 4WRD is in use or not. In the case of not having TSC and 4WRD in use, the arrangement operates with the four transceiver unit's transmitting and receiving different streams of digital signals in a manner similar to the prior art arrangement in FIG. 1*c*, i.e. one can say that all the four transceiver units TRU1, TRU2, TRU3, TRU4, operate in a normal mode. If the up- and downlink budgets need to be improved, for instance to achieve better coverage, for some of the digital traffic, two of the four transceiver units TRU1, TRU2, TRU3, TRU4 can be arranged to operate together according to TSC and 4WRD, thus transmitting and receiving the same stream of digital signals with the result of having approximately 3 dB improvements in both down- and uplink. Of course, all four transceiver, units TRU1, TRU2, TRU3, TRU4 can be arranged to operate in two pairs according to TSC and 4WRD to accomplish the improved link budget for all the digital traffic, where the price paid in this case is that the digital signal capacity is reduced to half compared to the case when the four transceiver units TRU1, TRU2, TRU3, TRU4 are operating in normal mode Since the antenna and radio arrangement 1 can have the same configuration independently of if TSC and 4WRD is in use or not, it is possible to control when to have TSC and 4WRD in use or not, by means of software. The software is used by a processor of any suitable type, for example a microprocessor or microcontroller, constituting controlling means, the controlling means being positioned in the antenna and radio arrangement 1 or outside it.

For instance, for a TDMA (time division multiple access) system, it is even possible by means of software control to switch for each time slot between TSC and 4WRD operation mode and a normal operation mode, i.e. TSC and 4WRD mode can be used for those terminals that are in need for an improved link budget. The obvious advantage is that the digital signal capacity is reduced only when there is a need for improved link budgets.

The same is valid for other mobile communication systems such as CDMA (code division multiple access).

Even though the invention is described in view of a configuration comprising four transceiver units, the principles of the invention can be used in other configurations with a greater or lesser number of transceiver units.

Figure 4:
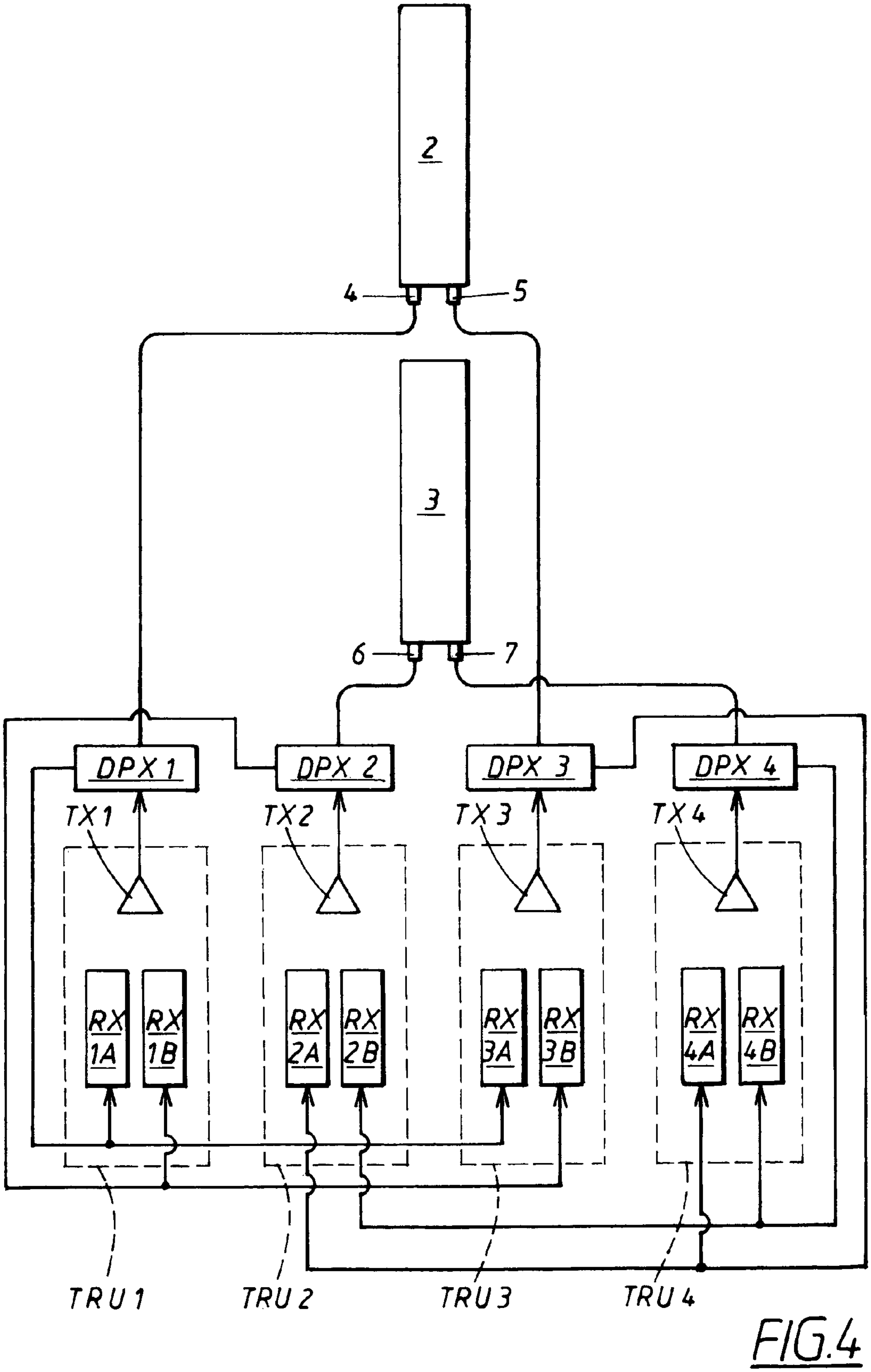
FIG. 4 schematically shows an antenna arrangement according to a second embodiment of the present invention.

In a second preferred embodiment, with reference to FIG. 4, the antennas 2, 3 are placed on top of each other, the first antenna 2 being placed on top of the second antenna 3.

The transceiver units TRU1, TRU2, TRU3, TRU4 are the same here as in the embodiment above, having the same basic configuration.

The first antenna's first antenna port 4 is connected to a first duplex filter DPX1, from which said antenna port 4 is connected to the first receiver sub-units RX1A, RX3A of the first and third transceiver units TRU1, TRU3, and to the transmitter sub-unit TX1 of the first transceiver unit TRU1.

The second antenna's first antenna port 6 is connected to a second duplex filter DPX2, from which said antenna port is connected to the second receiver sub-units RX1B, RX3B of the first and third transceiver units TRU1, TRU3, and to the transmitter sub-unit TX2 of the second transceiver unit TRU2.

The first antenna's second antenna port 5 is connected to a third duplex filter DPX3, from which said antenna port is connected to the first receiver sub-units RX2A, RX4A of the second and fourth transceiver units TRU2, TRU4, and to the transmitter sub-unit TX3 of the third transceiver unit TRU3.

Finally, the second antenna's second antenna port 7 is connected to a fourth duplex filter DPX4, from which said antenna port is connected to the second receiver sub-units RX2B, RX4B of the second and fourth transceiver units TRU2, TRU4, and to the transmitter sub-unit TX4 of the fourth transceiver unit TRU4.

In this embodiment, the same stream of modulating digital signals can be provided to the transmitter sub-units TX1, TX2 of the first and second transceiver units TRU1, TRU2. Furthermore, the transmitter sub-units TX3, TX4 of the third and fourth transceiver units TRU3, TRU4 can be provided with the same modulating stream of digital signals, although the stream of modulating digital signals transmitted by the third and fourth transceiver units TRU3, TRU4 is different from the one transmitted by the first and second transceiver units TRU1, TRU2.

In other words, the same first stream of digitals signals is transmitted on the +45° polarization ports 4, 6, and the same second stream of digital signals is transmitted on the −45° polarization ports 5, 7, the first and second streams being mutually different.

In this way, spatial combining takes place in a similar manner as described for the first embodiment. Here, however, it is desirable that the two output signals transmitted via the −45° polarization ports 5, 7 are combined in phase after leaving the antenna aperture. That is, the two signals are to be coherent at respective antenna aperture, i.e. they have to be in the same relative phase and hence the term Transmitter Coherent Spatial Combining (TCSC). In other words, the signals from the first and second transmitter sub-units TX1, TX2 have to be in the same relative phase after the first and second antennas 2, 3. In the same way, the signals from the third and fourth transmitter sub-units TX3, TX4 have to be in the same relative phase after the first and second antennas 2, 3.

Figure 1A:
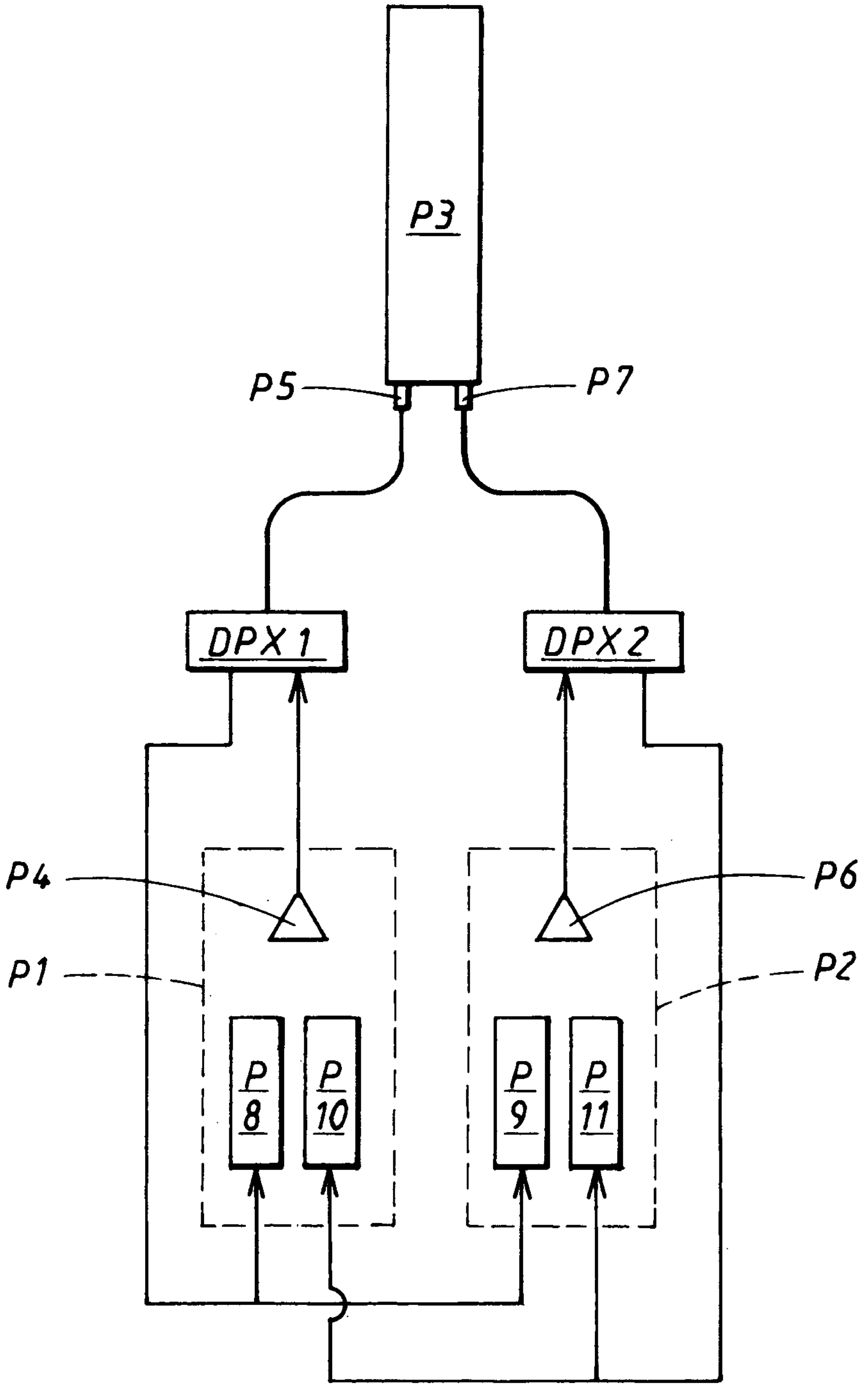
FIG. 1a PRIOR ART
FIG. 1*a* schematically shows a first example of an antenna arrangement according to prior art.
Figure 1B:
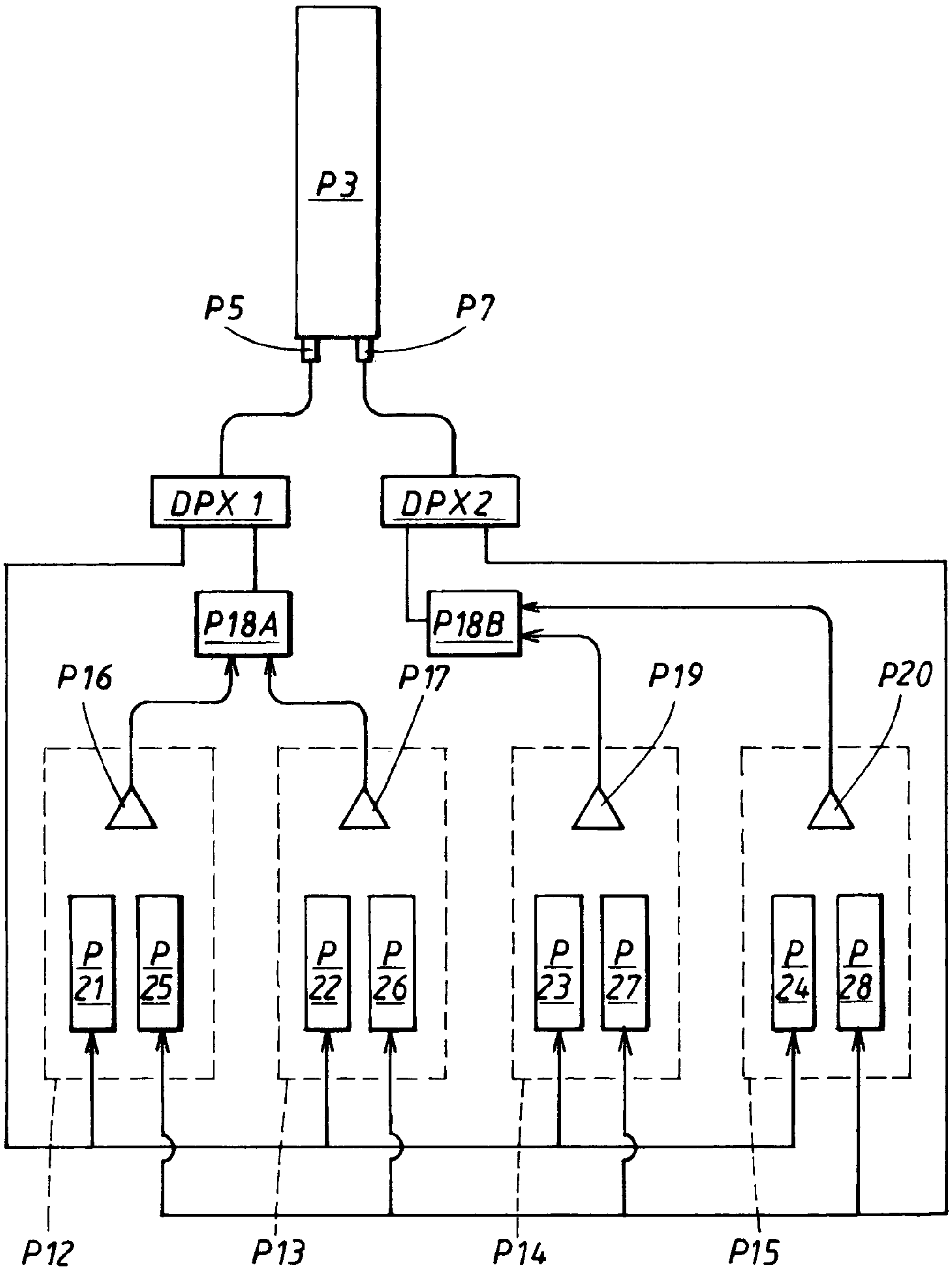
FIG.1b PRIOR ART
FIG. 1*b* schematically shows a second example of an antenna arrangement according to prior art.
Figure 1C:
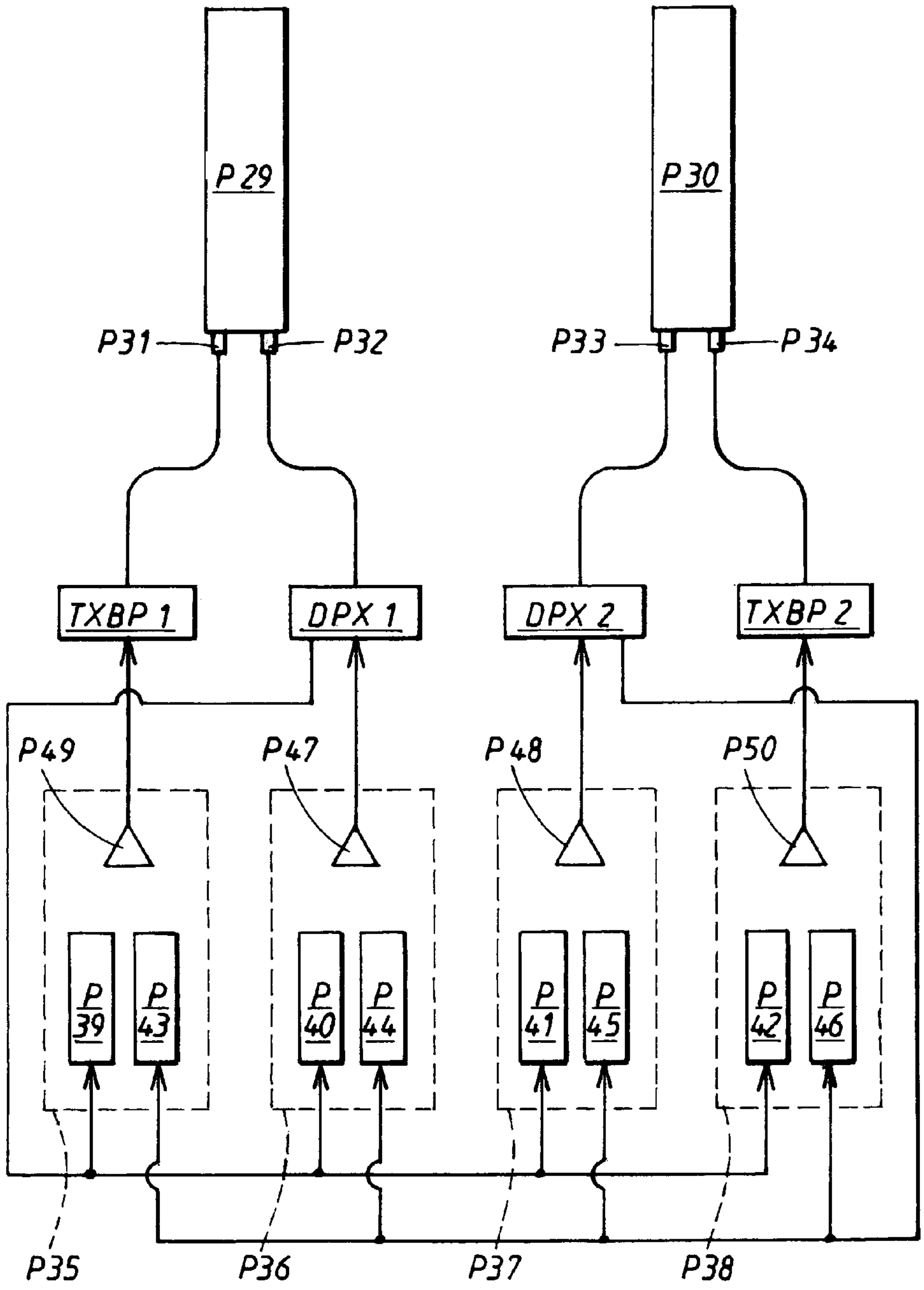
FIG.1c PRIOR ART
FIG. 1*c* schematically shows a third example of an antenna arrangement according to prior art.
Figure 2:
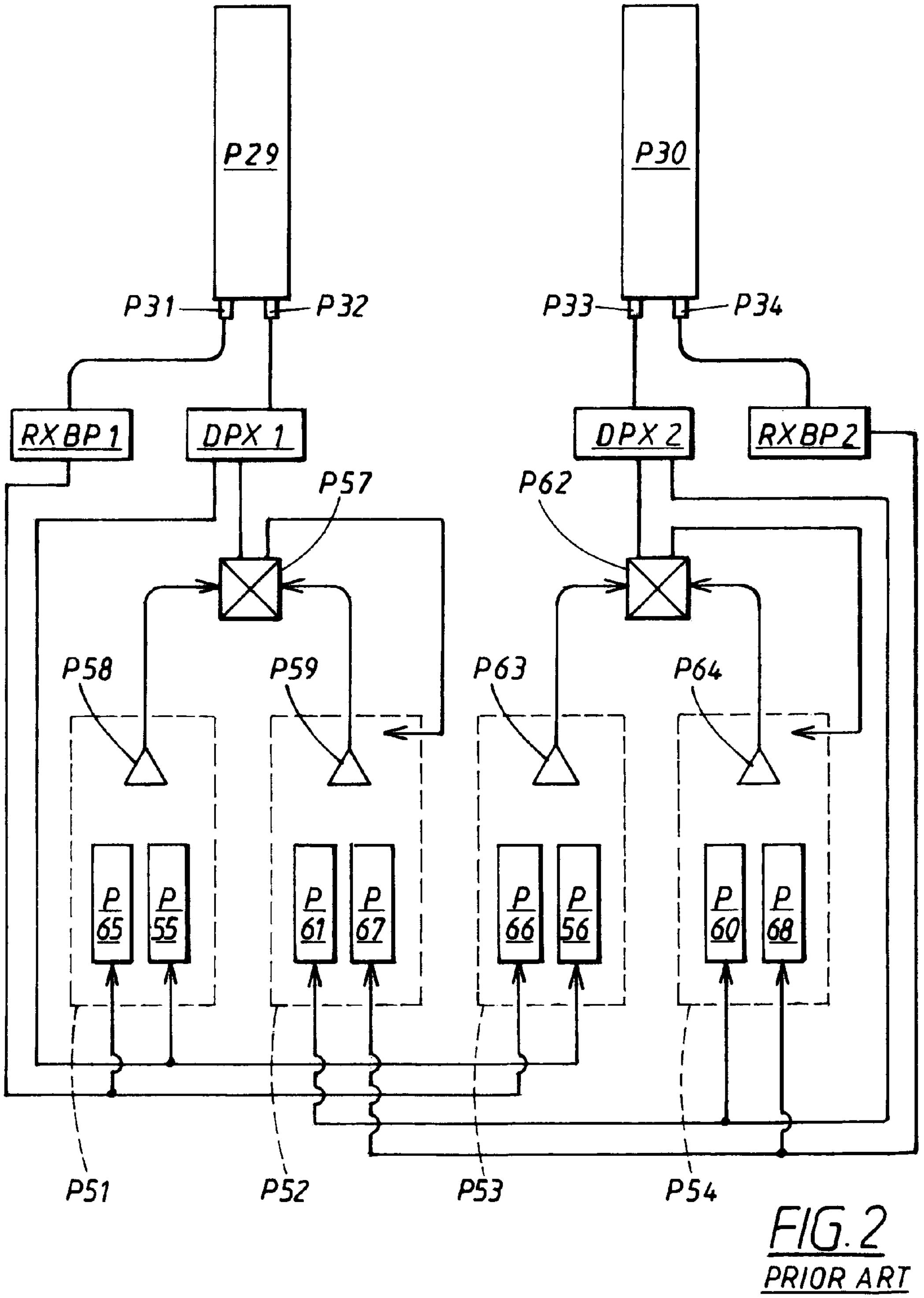
FIG. 2 PRIOR ART
FIG. 2 schematically shows a fourth example of an antenna arrangement according to prior art.

This means that the downlink budget is increased with approximately 6 dB relative to the configuration according to FIG. 1*c;* 3 dB from the spatial combining of the power from two transmitters and 3 dB from the doubling the antenna area and thereby increasing the antenna gain by a factor of two (3 dB). The downlink signal capacity is here reduced to half, since it only transmits two streams of digital signals instead of four, compared to the configuration in FIG. 1*c*.

It is here of course possible to only use TCSC on one of the polarizations, i.e. to transmit the same digital signal on one of the polarizations and different signals on the respective ports on the other polarization. For example, it is possible to send the same stream of digital signals on the +45° polarization ports 4, 6, but different streams of digital signals on the respective −45° polarization ports 5, 7, these streams of modulating digital signals also being different from the modulating digital signals transmitted on the +45° polarization ports 4, 6.

In this case, the downlink budget is increased with approximately 6 dB relative to the configuration according to FIG. 1*c* for the first antenna ports (+45° polarization) 4, 6; 3 dB from the spatial combining and 3 dB from the increased antenna gain. The downlink signal capacity is here reduced to transmitting three streams of digital signals instead of four, compared to the configuration in FIG. 1*c*.

When using TCSC on the first antenna ports 4, 6, it is also possible to let the four receiver sub-units RX1A, RX1B, RX2A, RX2B of the first transceiver unit TRU1 and the second transceiver unit TRU2 to form one receiver with 4WRD, since each of them is connected to one unique antenna port. Thus at least a 3 dB improvement in the uplink is obtained. The uplink signal capacity of TRU1 and TRU2 is reduced to half, since the two pairs of receiver sub-units RX1A, RX1B, RX2A, RX2B in each transceiver unit TRU1, TRU2 act as one 4WRD receiver. Thus combing TSCS and 4WRD will give approximately a 6 dB improvement in downlink and approximately a 3 dB improvement in uplink. In this case, there is a 3 dB imbalance in the down- and uplink improvements.

When applying TSCS on the second antenna ports 5, 7, it is possible to use the four receiver sub-units of RX3A, RX3B, RX4A, RX4B of the third transceiver unit TRU3 and the fourth transceiver unit TRU4 in the same way as for the first antenna ports 4, 6 to form one receiver with 4WRD, since each of them is connected to one unique antenna port and thus giving at least a 3 dB improvement in the uplink.

The main difference between the first and second embodiments of the invention is basically that in the first embodiment, TSC is accomplished by transmitting the same output signal carrying the same modulating stream of digital signals on two antenna ports with orthogonal polarizations and let them combine in the air after leaving the antenna, thus giving a 3 dB increase of the radiated power, while in the second embodiment TCSC is accomplished by transmitting the same output signal carrying the same modulating stream of digital signals on two antenna ports with same polarization where one antenna port belongs to a first antenna and the second belongs to a second antenna, preferably placed on top of the first antenna, and letting them combine coherently in the air after leaving respective antennas, thus giving a 3 dB increase of the radiated power and simultaneously a 3 dB increase of the antenna gain.

Figure 5:
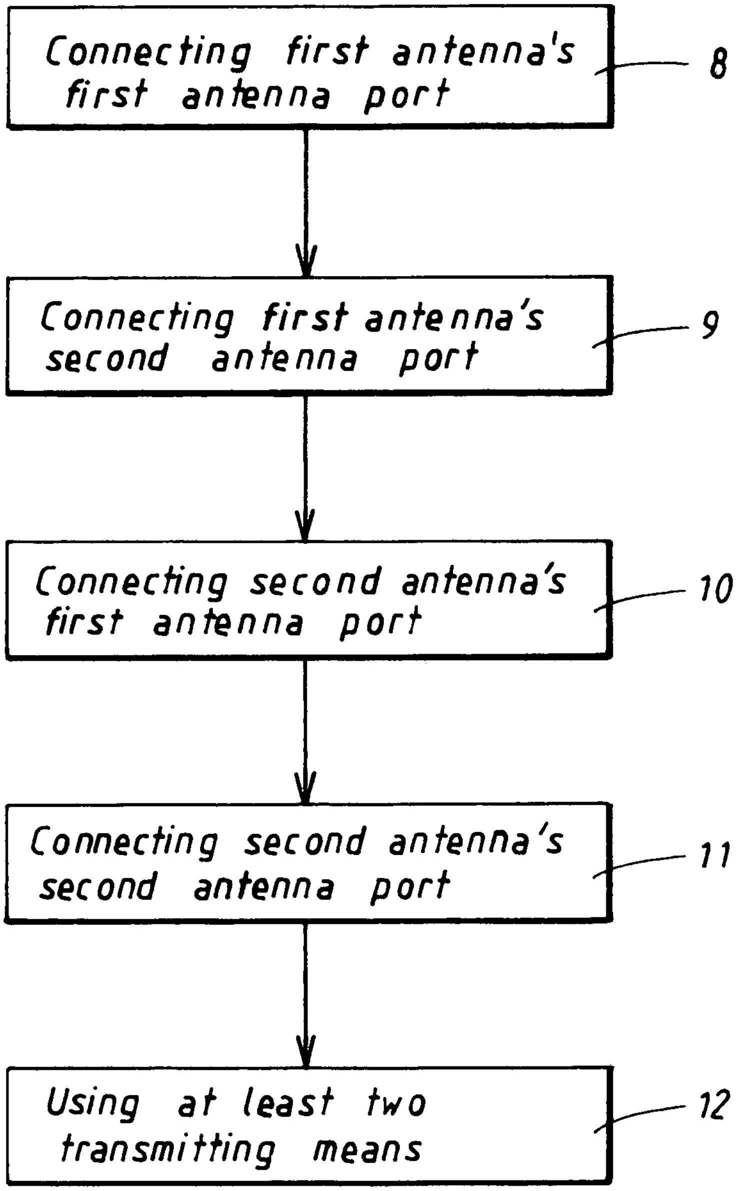
FIG. 5 shows a flow chart for a method according to the present invention.

With reference to FIG. 5, the present invention also relates to a corresponding method with the following method steps:

8: connecting the first antenna's first antenna port 4 to a first transmitting means TX1;

9: connecting the first antenna's second antenna port 5 to a second transmitting means TX2;

10: connecting the second antenna's first antenna port 6 to a third transmitting means TX3;

11: connecting the second antenna's second antenna port 7 to a fourth transmitting means TX4; and 12: using at least two transmitting means TX1, TX2, TX3, TX4 for transmitting signals to the corresponding antenna ports 4, 5, 6, 7, said signals being modulated by the same stream of digital signals and having the same radio carrier frequency, thus accomplishing a spatial combining of the output signals.

The invention is not limited to the embodiment examples disclosed above. For example, the number of antennas may be more than the two in the examples, and the number of transceiver units may be more than the four in the examples.

The essence of the present invention relates to the combining of two transmitted signals after the signals have left the antenna radiating elements, which is here referred to as spatial combining. In a first main variant, the spatial combining is performed by pair-wise connecting antenna ports having different polarizations to a corresponding number of transmitters, transmitting the same signal. In a second main variant, the spatial combining is performed by connecting a number of antenna ports, having the same polarization, to a number of transmitters, transmitting the same signal, where this signal is coherent when being fed to the respective antenna ports.

The polarizations +45° and −45° used in the examples are only mentioned by way of example. Any polarization states may be used for the dual polarized antennas, preferably constituting essentially orthogonal polarizations.

The transceiver units may be of any suitable kind, the usual ones being commonly known under the designation TRU. The transmitting and receiving sub-units comprised in the transceiver units are of any known suitable kind, and constitute transmitting and receiving means.

Although the present invention is especially disclosed with GSM (Global System for Mobile communications) in mind, the basic ideas are applicable for other systems such as WCDMA (Wideband Code Division Multiple Access) and LTE (Long Term Evolution), where the implementation presumably will be somewhat different.

The antennas used may be of any suitable kind, for example dipole or patch antennas. The antennas are preferably of the sector covering type, the antenna elements being arranged in a vertically arranged column. Other antenna types and other arrangements of the radiating elements are possible, for example a horizontal row.

The antenna arrangement is described as a first and a second dual polarized sector antenna placed beside each other at a distance, but can as well be an antenna arrangement where two dual polarized sector antennas are integrated into the same housing, what is commonly referred to as a quad-antenna, i.e. an antenna with four ports, where each port has an antenna radiation pattern covering the same sector. Other possibilities exist, for instance, the case of four single polarized sector antennas constituting space diversity.

A transceiver unit is also called transmitter receiver unit.

The invention claimed is:

1. An antenna and radio arrangement, comprising:

at least a first antenna, having a first antenna port and a second antenna port;

a second antenna, having a first antenna port and a second antenna port;

at least a first transmitting means, a second transmitting means, a third transmitting means, and a fourth transmitting means, where the first antenna's first antenna port is connected to the first transmitting means, the first antenna's second antenna port is connected to the second transmitting means, the second antenna's first antenna port is connected to the third transmitting means, and the second antenna's second antenna port is connected to the fourth transmitting means;

a number of receiving means, such that each group of one transmitting means and two receiving means forms one transceiver unit;

wherein at least two transmitting means transmit signals to the corresponding antenna ports, said signals being modulated by the same stream of digital signals and having the same radio carrier frequency, thus accomplishing a spatial combining of the output signals; and wherein the four receiving means of two transceiver units are connected to the first antenna's first antenna port, the first antenna's second antenna port, the second antenna's first antenna port and the second antenna's second antenna port such that a 4-Way Receiver Diversity, 4WRD, receiver functionality is obtained.

2. The antenna and radio arrangement according to claim 1, wherein the transmitted signals being modulated by the streams of digital signals are transmitted via pairs of antenna ports having essentially mutually orthogonal polarizations and being spatially combined in phase.

3. The antenna and radio arrangement according to claim wherein the transmitted signals being modulated by the streams of digital signals are transmitted via pairs of antenna ports having essentially the same polarizations.

4. The antenna and radio arrangement according to claim 1, wherein this connection arrangement is repeated for every two transceiver units in the antenna and radio arrangement, each such pair of transceiver units forming a 4WRD receiver.

5. The antenna and radio arrangement according to claim 1, wherein the number of transceiver units in the antenna and radio arrangement is even.

6. The antenna and radio arrangement according to claim 1, wherein the antennas are mounted on top of each other.

7. The antenna and radio arrangement according to claim 1, wherein a controlling means is arranged to control which transmitting means that each stream of digital signals to modulate the transmitters is to be connected to, the controlling means using suitable software.

8. The antenna and radio arrangement according to claim 1, wherein a controlling means is arranged to control which receiving means that each received stream of digital signals is connected to, the controlling means using suitable software.

9. A method for handling an antenna and radio arrangement comprising at least a first antenna, having a first antenna port and a second antenna port, and a second antenna, having a first antenna port and a second antenna port, where the method comprises the following steps:

connecting the first antenna's first antenna port to a first transmitting means;

connecting the first antenna's second antenna port to a second transmitting means;

connecting the second antenna's first antenna port to a third transmitting means; and connecting the second antenna's second antenna port to a fourth transmitting means, wherein the method further comprises the following step:

using at least two transmitting means for transmitting signals to the corresponding antenna ports, said signals being modulated by the same stream of digital signals and having the same radio carrier frequency, thus accomplishing a spatial combining of the output signals; and wherein a number of receiving means are used for receiving streams of digital signals, such that each group of one transmitting means and two receiving means forms one transmitting and receiving unit, where each group of four receiving means is used to obtain a 4-Way Receiver Diversity, 4WRD, receiver functionality by connecting each receiving means in each group to a unique antenna port.

10. The method according to claim 9, wherein pairs of antenna ports, having essentially mutually orthogonal polarizations, are used to transmit the signals being modulated by the streams of digital signals such that they are spatially combined in phase.

11. The method according to claim 9, wherein pairs of antenna ports, having essentially the same polarizations, are used to transmit the signals being modulated by the streams of digital signals.

12. The method according to claim 9, wherein software is used to control which transmitting means that each stream of digital signals to modulate the transmitters is connected to.

13. The method according to claim 9, wherein software is used to control which receiving means that each received stream of digital signals is connected to.

* * * * *

UNITED STATES PATENT AND TRADEMARK OFFICE

CERTIFICATE OF CORRECTION

PATENT NO. : 8,457,244 B2
APPLICATION NO. : 12/808458
DATED : June 4, 2013
INVENTOR(S) : Johansson It is certified that error appears in the above-identified patent and that said Letters Patent is hereby corrected as shown below:

In the Specification:

In Column 6, Lines 44-45, delete “transceiver,” and insert -- transceiver --, therefor.

In the Claims:

In Column 10, Line 22, in Claim 3, delete “claim” and insert -- claim 1, --, therefor.

Signed and Sealed this
Fifteenth Day of October, 2013

Teresa Stanek Rea
*Deputy Director of the United States Patent and Trademark Office*